United States Patent [19]

Kamio

[11] Patent Number: 4,597,320
[45] Date of Patent: Jul. 1, 1986

[54] DIAPHRAGM TYPE VACUUM ACTUATOR

[75] Inventor: Takenori Kamio, Neyagawa, Japan

[73] Assignee: Kabushiki Kaisha Daikin Seasakusho, Neyagawa, Japan

[21] Appl. No.: 719,626

[22] Filed: Apr. 3, 1985

Related U.S. Application Data

[63] Continuation of Ser. No. 476,511, Mar. 18, 1983, abandoned.

[30] Foreign Application Priority Data

Mar. 24, 1982 [JP] Japan ............................ 57-42284[U]

[51] Int. Cl.⁴ .................................................. F15B 9/10
[52] U.S. Cl. ...................................... 91/465; 92/98 D; 92/100; 92/185
[58] Field of Search ................. 92/182, 183, 184, 185, 92/100, 168, 98 D; 91/32, 437, 465

[56] References Cited

U.S. PATENT DOCUMENTS

| | | | |
|---|---|---|---|
| 905 | 9/1838 | Horton | 92/183 |
| 3,311,029 | 3/1967 | Kimble | 92/185 |
| 4,211,152 | 7/1980 | Colletti et al. | 92/168 |
| 4,286,932 | 9/1981 | Nagano et al. | 92/100 |
| 4,387,626 | 6/1983 | Myers | 92/98 D |

FOREIGN PATENT DOCUMENTS

| | | | |
|---|---|---|---|
| 485659 | 1/1918 | France | 92/183 |
| 5934 | of 1884 | United Kingdom | 92/183 |

Primary Examiner—Robert E. Garrett
Assistant Examiner—John M. Husar
Attorney, Agent, or Firm—Armstrong, Nikaido, Marmelstein & Kubovcik

[57] ABSTRACT

A diaphragm type vacuum actuator movably providing in a case a rod having piston plates, the piston plates being connected to an inner peripheral surface of the case by means of two diaphragms so as to divide a case inside into a first chamber and a second chamber and form an intermediate chamber in between the both diaphragms, and the rod being made movable by subjecting one of said first and second chambers to vacuum and by opening the other thereof to atmospheric pressure; characterized by that air passages are formed in the piston plates, one ends of the air passages are interconnected to the intermediate chamber, and the other ends thereof are interconnected to chambers under atmospheric pressure.

2 Claims, 5 Drawing Figures

DIAPHRAGM TYPE VACUUM ACTUATOR

This application is a continuation of application Ser. No. 476,511, filed Mar. 18, 1983, abandoned.

BACKGROUND OF THE INVENTION

This invention relates mainly to an actuator for operatively changing an auxiliary transmission for use in an automobile, a tractor etc, particularly to a diaphragm type vacuum actuator having two diaphragms and being actuated utilizing vacuum.

An object of this invention is to prevent abnormal deformation or breakage of a diaphragm as well as to prevent water and dust entering an intermediate chamber between two diaphragms from outside, thus permitting the diaphragms to function always in a good condition.

Another object of this invention is to securely prevent air leakage even when a rod becomes eccentric due to error of mounting when assembling it case, or when oscillating movement of the rod occurs.

In order to accomplish the above object, in this invention air passages are formed in piston plates, one end of each of the air passages is interconnected to the intermediate chamber, and the other end thereof is interconnected to the chambers under atmospheric pressure. A rod is movably provided in the case and has piston plates mounted thereon. The piston plates are connected to an inner peripheral surface of the case by two diaphragms so as to divide the inside of the case into a first chamber and a second chamber and to form an intermediate chamber in between both diaphragms. The rod is moved by subjecting one of said first and second chambers to vacuum and by opening the other thereof to atmospheric pressure.

Further, in order to accomplish the second object, a bearing support ring and a seal are fitted onto an outer peripheral surface of the rod, the seal being engaged with and held by the support ring. The seal is urged against a peripheral surface of a rod inserting hole of the case in the axial direction by means of suitable spring means. The seal and the support ring are made movable in the radial direction in conformity with a radial deviation of the rod.

DETAILED DESCRIPTION OF THE INVENTION

Figure 1:
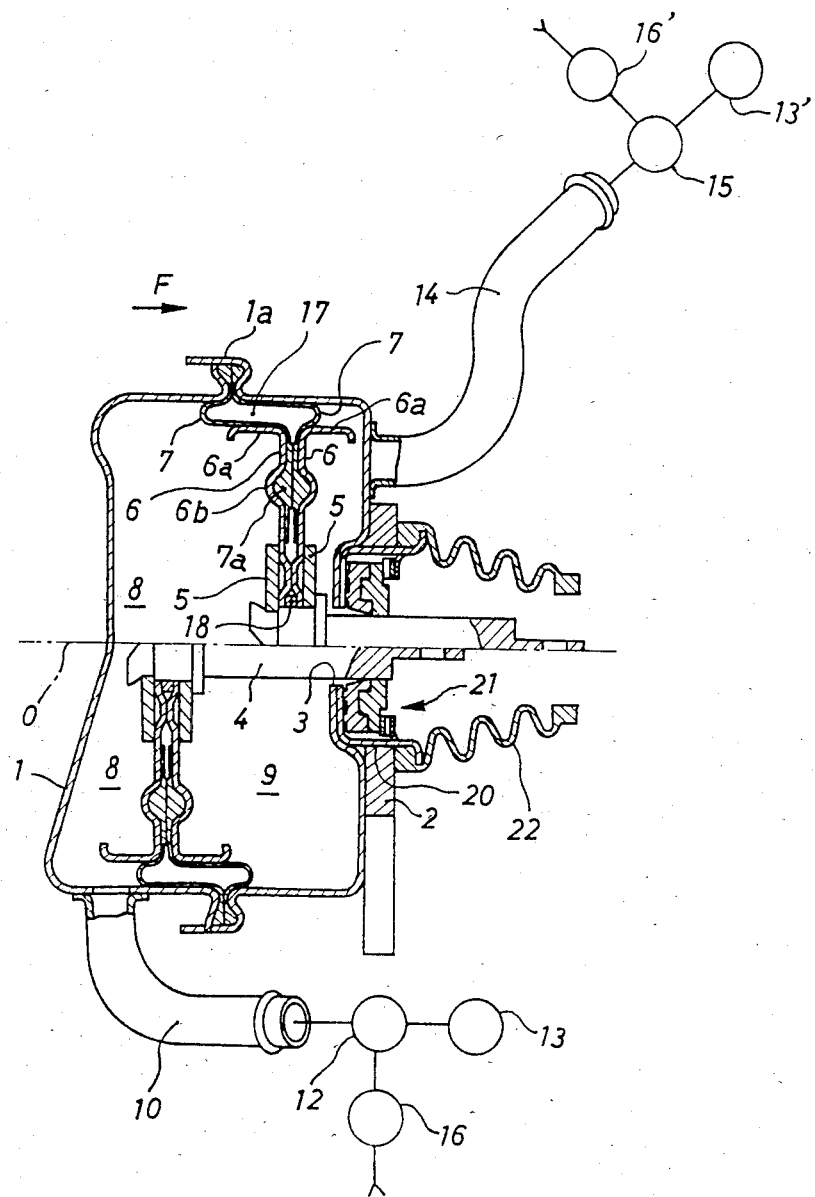
FIG. 1 is a vertical sectional view of a diaphragm type vacuum actuator according to this invention.

FIG. 1 is a vertical sectional view of the actuator, in which the upper half and the lower half show different operating conditions respectively. In this FIG. 1, an actuator case 1 comprises a pair of case members (left and right members in FIG. 1) which are combined together, the right member of the case 1 being secured, for example, to a transmission case for automobile through a bracket 2. A rod 4 is inserted axially movably through a rod passing hole 3 into the case 1. The right end of the rod 4 is connected, for example, to an auxiliary transmission gear shaft. A pair of plate supports 5 are secured to the rod 4 at its inner side end of the case 1, and a pair of annular piston plates 6 are sandwiched between the plate supports 5. Two rubber diaphragms 7 are sandwiched between the piston plates 6, outer peripheral edges of the diaphragms 7 being secured by a joint portion 1a of the case 1.

An inside of the case 1 is divided into first and second chambers 8, 9 by said piston plates 6 and said diaphragms 7. The first chamber 8 is connected to a first changeover valve (for example, an electromagnetic valve) 12 through a first pipe 10. The first changeover valve 12 is connected freely changeably to a vacuum feeding portion 13 or to an air cleaner 16, for example, on the atmospheric side. The second chamber 9 is connected to a second changeover valve 15 through a second pipe 14. The changeover valve 15 is connected freely changeably to a vacuum feeding portion 13' or to an air cleaner 16' on the atmospheric side.

The diaphragm 7 on the side of the first chamber 8 projects convexly in the direction of the first chamber. The diaphragm 7 on the side of the second chamber 9 projects convexly in the direction of the second chamber 9, an intermediate chamber 17 being formed in between both diaphragms 7. Cylindrical diaphragm supports 6a are formed on outer peripheral edges of the piston plates 6, which support the diaphragms 7 to prevent them from deflecting toward the side of rod central axis 0. Both diaphragms 7 extend through between the piston plates 6 toward the rod central axis 0, on the way of which there are provided annular aligning projections 7a that engage with annular recessions 6b of the piston plate 6. 18 is a seal ring.

A seal case 20 is welded to a peripheral edge of the passing hole 3 of the case 1 as a part of the case 1, and a seal means 21 is disposed in the seal case 20. 22 is a dust preventive boot, one end (the left end of FIG. 1) of which is fixed to an outer peripheral edge of the seal case 20, and the other end thereof is fixed to the transmission case.

Figure 2:
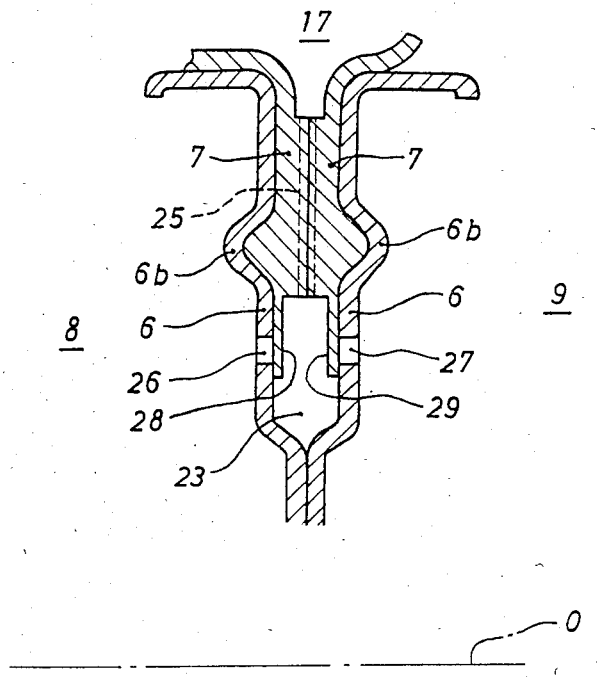
FIG. 2 is an enlarged view of a portion of a piston plate.

In FIG. 2 showing the enlarged view of the portion of the piston plates 6, an annular chamber 23 is formed in a portion between the piston plates 6 nearer to the rod central axis 0 than the recessions 6b. The annular chamber 23 is interconnected to the intermediate chamber 17 through grooves 25 in the diaphragms 7. A plurality of, for example four, grooves 25 are disposed circumferentially with some spaces kept therebetween, and radially from the rod central axis 0. On annular chamber portions of both the piston plates 6, there are provided a first valve hole 26 leading from the first chamber 8 to the annular chamber 23 and a second valve hole 27 leading from the second chamber 9 to the annular chamber 23 respectively. The first and second valve holes 26, 27 may be formed in one place for each, or in plural places with circumferential spaces kept therebetween respectively for each. First and second reed valves 28, 29 extending in the direction of rod central axis 0 are formed integrally with the diaphragms respectively. The reed valves 28, 29 shut off the first and second valve holes 26, 27 respectively from the annular chamber 23 in such a manner that it can be opened or closed freely.

Figure 3:
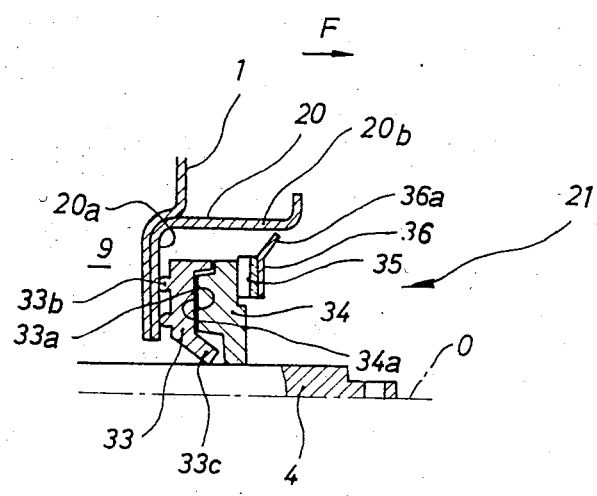
FIG. 3 is an enlarged view of a portion of a seal means.

In FIG. 3 showing the enlarged view of the portion of the seal means 24 of FIG. 1, the seal case 20 is provided with a seal plane 20a perpendicular to the rod central axis 0 and a cylindrical part 20b. A seal 33, a bearing support ring 34, and wave washer (spring means) 35 are disposed in the case 20, as the seal means 21, in this order from the side of the seal plane 20a. The seal 33 and the support ring 34 are fitted onto an outer peripheral surface of the rod 4. The support ring 34 securely holds the seal 33 by engaging an annular recession 33a of the seal 33 with an annular projection 34a of the support ring 34. The wave washer 35 fits onto a shouldered portion of the support ring 34 and simultaneously a surface thereof opposite to the seal plane 20a makes contact with a circular internal ring 36. The internal ring 36 is a so-called ratchet ring, having a claw 36a inclining in the direction of the arrow F on its peripheral edge, and being engaged with an inner peripheral surface of the cylindrical part 20b in such a manner that it can be pushed and moved only in the direction opposite to the arrow F and can not be backed in the direction of the arrow F. Namely, elastic force of the wave washer 35 urges an annular projection 33b of the seal 33 toward the seal plane 20a through the support ring 34, naturally parallel to the axial direction.

An inner peripheral surface of the support ring 34 fits onto the rod 4 with little radial play left therebetween, and a lip portion 33c of the seal 33 contacts the outer peripheral surface of the rod 4 with a constant pressure.

Accordingly, the seal 33 is movable in the radial direction together with the support ring 34 and the rod 4 in relation to the case 20. Nevertheless, the seal 33 and the support ring 34 do not become eccentric with the rod 4.

Now, functions of the actuator will be described hereunder. When the first chamber 8 is opened to the atmosphere and the second chamber 9 is subjected to the vacuum simultaneously by operatively changing the first and second changeover valves 12, 15, the piston plates 6 and the rod 4 shift in the direction of the arrow F to the position shown by the upper half in FIG. 1, thus changing the auxiliary transmission to a higher side for example. In this instance, the second reed valve 29 (FIG. 2) shuts off the second valve hole 27 with a constant pressure by the agency of the vacuum in the second chamber 9 to obstruct air flow from the annular chamber 23 (intermediate chamber 17) into the second chamber 9. On the other hand, the first reed valve 28 reaches a condition wherein it can be opened easily or is opened. Consequently, even if the pressure in the intermediate chamber 17 lowers, due to air leakage from the surface of the diaphragm 7 to the second chamber 9 caused by molecular leakage, or due to air leakage from a portion of the second reed valve 29 to the second chamber 9; air is supplied from the first chamber 8 via the first valve hole 26 thereto to maintain the pressure in the intermediate chamber 17 at atmospheric pressure.

With the first chamber 8 subjected to the vacuum and the second chamber 9 opened to the atmospheric pressure, the piston plates 6 and the rod 4 shift in the direction opposite to the arrow F to the position shown by the lower half of FIG. 1, thus changing the auxiliary transmission to a lower side for example. In this instance, the second chamber 9 under the atmospheric pressure and the annular chamber 23 (intermediate chamber 17) are interconnected to each other through the second reed valve 29 and the second valve hole 27, thus maintaining the intermediate chamber 17 at the atmospheric pressure.

Figure 4:
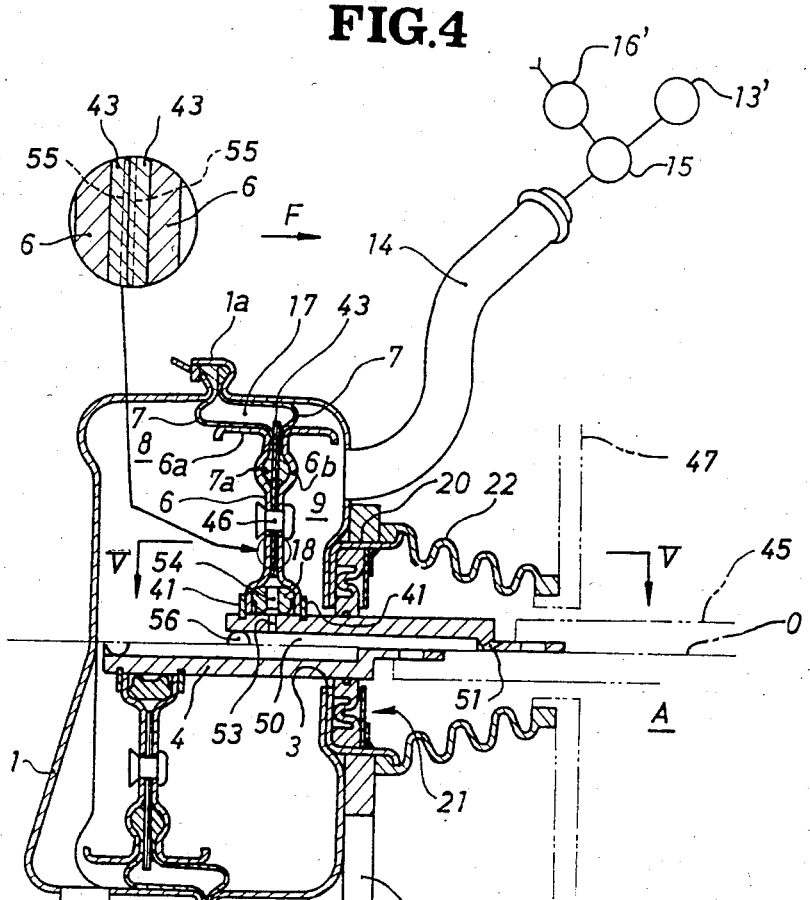
FIG. 4 is a vertical sectional view showing another embodiment.

FIG. 4 shows another embodiment according to this invention, components corresponding to those of FIG. 1 being indentified by the same numerals with FIG. 1. In FIG. 4, the right end of the rod 4 is connected to an auxiliary transmission gear shaft 45 for example. A pair of annular piston plates 6 fit onto the rod 4 at its end portion in the case 1, the piston plates 6 being fixed axially immovably by means of a pair of snap rings 41. Two interconnecting passage forming annular steel plates 43 are sandwiched in between the piston plates 6. The piston plates 6 and the steel plates 43 are connected integrally by rivets 46. The annular aligning projections 7a of the rubber diaphragms 7 are sandwiched between both sides near to outer peripheral portions of the steel plates 43 and the annular recessions 6b of the both piston plates 6 respectively, the outer peripheral edges of the diaphragms 7 being secured by the joint portion 1a of the case 1. An axially wide space is formed between inner peripheral edges of the both piston plates 6 in order to dispose the seal ring 18 therein.

The right end of the boot 22 shown in FIG. 4 is fixed to a transmission case portion (flange portion) 47, and an inside of the boot 22 is interconnected to a transmission chamber A which is maintained at the atmospheric pressure.

Figure 5:
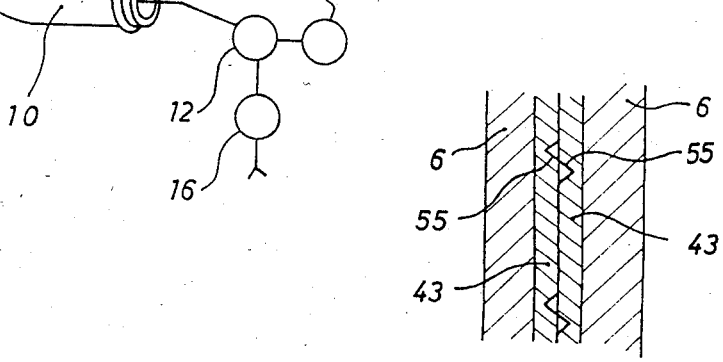
FIG. 5 is an enlarged sectional view taken substantially on the line V—V of FIG. 4.

An axially extending air passage 50 is formed in the rod. An end of the air passage 50 at the F-arrowed-side opens to the inside of the boot 22 through a first hole 51. An end of the air passage 50 at the opposite-to-F-arrowed side opens to a side of the seal ring 18 through a second hole 53 perpendicular to the central axis 0. An interconnecting hole 54 interconnecting to said second hole 53 is formed in the seal ring 18. Plural interconnecting passages 55 interconnecting the intermediate chamber 17 with the interconnecting hole 54 are formed radially on the steel plates 43. The interconnecting passages 55 comprise, for example, V-shaped grooves formed on planes of steel plates facing each other as shown in FIG. 5. 56 of FIG. 4 is a spherical cover. In the actuator shown in FIG. 4, the seal means 21 having the construction as shown in FIG. 3 may be substituted for the seal means 21 shown in FIG. 4.

Functions of the actuator shown in FIG. 4 will be described hereunder. When the first chamber 8 is opened to the atmospheric pressure and at the same time the second chamber 9 is subjected to the vacuum through operations of the first and second changeover valves 12, 15, the piston plates 6 and the rod 4 shift in the direction of the arrow F to the position shown by the upper half of FIG. 4, thus changing the auxiliary transmission to a higher side for example.

On the contrary, when the first chamber 8 is subjected to the vacuum and at the same time the second chamber 9 is opened to the atmospheric pressure, the piston plates 6 and the rod 4 shift in the direction opposite to the arrow F to the position shown by the lower half of FIG. 4, thus changing the auxiliary transmission to a lower side for example.

Even if air leaks from the surface of the diaphragm 7 due to molecular leakage while the actuations as mentioned above are repeated, the pressure in the intermediate chamber 17 is always kept at the atmospheric pressure because air is supplied from the transmission chamber A through the air passage 50 and the interconnecting passage 55 to the intermediate chamber 17.

Generally, the purpose of keeping the pressure in the intermediate chamber 17 at the atmospheric pressure is to prevent the diaphragm 7 from being abnormally deformed and from being broken. Referring now to FIG. 1, description will be given hereunder to the case where the valve holes 26, 27 of FIG. 2 and the air passage 50 etc. are not provided. Although the intermediate chamber 17 has previously been preset to the atmospheric pressure, air in the intermediate chamber 17 leaks gradually from the surface of the diaphragm 7 due to for example the molecular leakage as mentioned above, and the pressure in the intermediate chamber 17 decreases during frequent operations of the actuator. When the pressure in the intermediate chamber 17 decreases under the condition, for example, shown by the upper half of FIG. 1, the diaphragm 7 at the side of the first chamber 8 yields in the direction of the arrow F to deform into an abnormal shape so that the diaphragm 7 might be broken.

In order to maintain the pressure in the intermediate chamber 17 at the atmospheric pressure, conventionally for example, a passage comprising an extending piece has been provided at the joint portion 1a of the case 1 to permit the intermediate chamber 17 open directly to the outside. However, in case of the intermediate chamber 17 opening directly to the outside, there have been such disadvantages that water and dust have entered the intermediate chamber 17 to damage the diaphragms 7, and that dust and muddy water have blocked the opening portions to inhibit the intermediate chamber being kept at the atmospheric pressure.

On the contrary, not only the intermediate chamber 17 can always be kept at the atmospheric pressure to prevent the diaphragm 7 from being deformed abnormally and broken, but the following advantages are obtainable according to the present invention.

(1) Since the intermediate chamber 17 does not open directly to the outside (atmosphere), there is little possibility of water and dust entering the chamber. Accordingly, a harmful influence upon functioning of the diaphragms 7 due to accumulation of water and dust in the intermediate chamber 17 can be avoided, and the diaphragms 7 can always be actuated in good condition.

(2) Deterioration of material of the diaphragm 7 due to muddy water etc. can be avoided, and service life of the diaphragm 7 can be improved further.

(3) In the means shown in FIGS. 1 & 2, since there is no possibility of dust clogging in the first and second valve holes 26, 27; the trouble, that the intermediate chamber 17 can not be maintained at the atmospheric pressure during operation of actuator, will be removed.

(4) When the seal means 21 shown in FIG. 3 is provided, even in the event of the rod 4 becoming eccentric in relation to the case 1 due to mounting error of the case 1, or in the event of the rod 4 oscillating in the radial direction; the seal 33 will follow the rod 4 in the radial direction through the support ring 34 to enable secure sealing of the outer peripheral surface of the rod 4 by means of the inner peripheral edge (lip 33c) of the seal 33. Moreover, the seal 33 (projection 33b) is axially pressed against the seal plane 20a by means of the wave washer 35 so that the seal plane 20a can also be kept sealed securely even when the seal 33 moves in the radial direction.

Namely, even when the rod 4 becomes eccentric in relation to the case 1 due to mounting error of the case 1, the outer peripheral surface of the rod 4 and the seal plane 20a can be securely sealed to prevent air leakage certainly. Further, pinching of the seal 33 becomes avoidable to prolong service life of the seal 33.

For material of the diaphragm 7 in this invention, synthetic resin may be used other than rubber. In the means shown in FIG. 4 and FIG. 5, the chamber interconnecting the air passage 50 is not limited to the transmission chamber A, but any chamber having a large volume, which in effect incorporates a transmission etc. by the actuator and is isolated from outsides but usually kept at the atmospheric pressure, may be used.

What is claimed is:

1. A diaphragm vacuum, actuator comprising:
    a generally cylindrical case,
    a rod extending into said case,
    means surrounding said rod for sealing said case,
    a pair of piston plates mounted on said rod in said case, said piston plates being formed with cylindrical diaphragm support members on their outer peripheral edges extending parallel to said case,
    two diaphragms held between said piston plates and connected to an inner peripheral surface of said case dividing the inside of said case into a first chamber and a second chamber and defining an intermediate chamber between said diaphragms, said diaphragm support members preventing said diaphragms from deflecting toward said rod, and
    means for selectively subjecting one of said first and second chambers to vacuum and opening the other to atmospheric pressure comprising:
    air passages formed in said piston plates, one end of each air passage being open to one of said first and second chambers and the other end being open to said intermediate chamber, and check valves in said air passages permitting air flow into said intermediate chamber and blocking air flow out of said intermediate chamber, said check valves consisting of reed valve members integrally formed on and extending inwardly from inner radial edges of said diaphragms to cover said other ends of said air passages within said intermediate chamber.

2. A diaphragm vacuum actuator as claimed in claim 1, wherein said case includes a seal case surrounding said rod having a seal plane perpendicular to an axis of said rod and a cylindrical portion parallel to said axis, and said means for sealing said case comprises:
    a seal fitted onto and having a lip portion sealingly engaging an outer peripheral surface of said rod and having an annular projection sealingly engaging said seal plane,
    a support ring fitted onto the outer periphery of said rod and having an annular projection engaging an annular depression in said seal and supporting said seal, and
    spring means urging said support ring and said seal towards said seal plane, said support ring and said seal being slidably movable against said seal plane in the radial direction in conformity with any radial deviation of said rod, said support ring and said seal both having a smaller outer diameter than an inner diameter of said cylindrical portion such that a clearance is maintained between the outer periphery of said support ring and seal and said cylindrical portion even upon radial deviation of said rod.

* * * * *